Oct. 4, 1955   J. W. HARRISON   2,719,895
THERMOSTAT APPARATUS
Filed Dec. 15, 1953
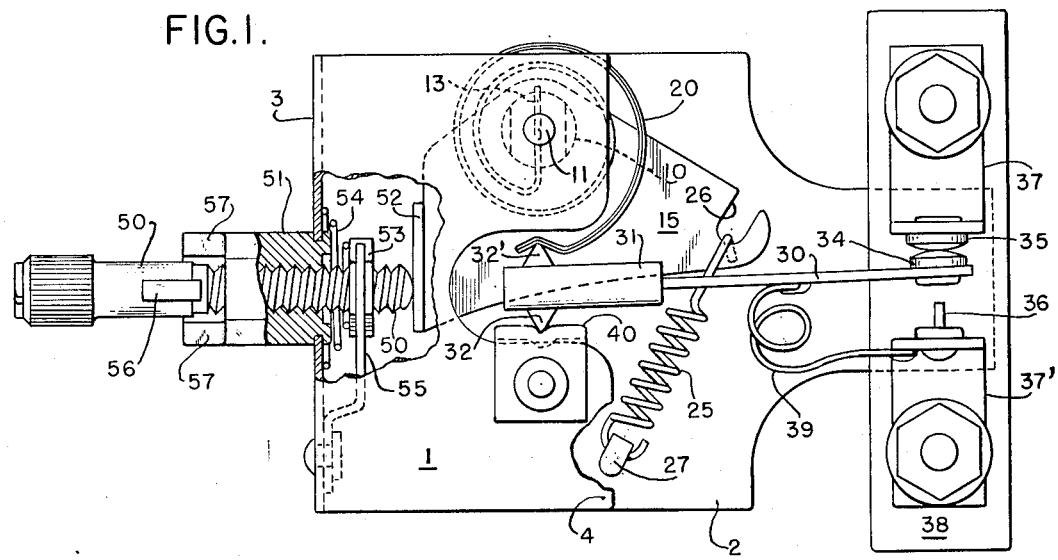
FIG.1.
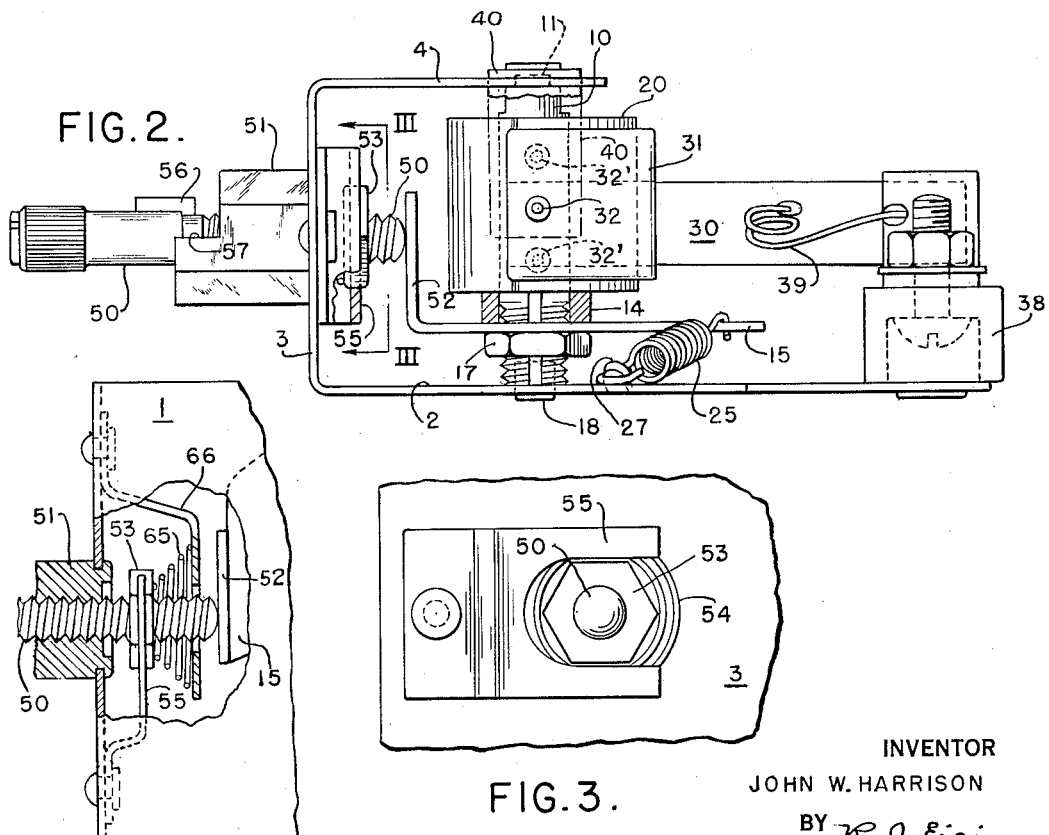
FIG.2.
FIG.3.
FIG.4.
INVENTOR
JOHN W. HARRISON
BY R. J. Eisinger
ATTORNEY

United States Patent Office 2,719,895
Patented Oct. 4, 1955

2,719,895

THERMOSTAT APPARATUS

John W. Harrison, Meadville, Pa., assignor to Westinghouse Electric Corporation, East Pittsburgh, Pa., a corporation of Pennsylvania Application December 15, 1953, Serial No. 398,271

4 Claims. (Cl. 200—138)

This invention relates to a thermostatic control wherein a desired control is effected in response to change in temperature. More particularly, this invention relates to a thermostatic switch having a thermally responsive operating element and means to adjust the temperature at which said element provides the desired control.

In thermostats of the type shown herein, it is desired to provide an adjusting screw which will provide considerable axial movement with a small amount of rotation. Such a requirement may be satisfied by the use of a screw thread having a very high pitch. With such a screw the forces exerted on the screw by the adjusted elements in the thermostat tend to force the adjusting screw in an axial direction, and because of the insufficient frictional resistance offered by the high pitch threads, the screw tends to turn, thereby changing the temperature setting.

An object of this invention is to provide a thermostatic control having an adjusting screw, with means to prevent the spring biased adjusted elements of the thermostat from affecting or disturbing the position or setting of the adjusting screw.

A further object of this invention is to provide a thermostatic device having an adjusting screw with a high pitch, with means for increasing the friction between the threads of the screw and the parts threaded thereon. The friction referred to here and elsewhere in the specification refers to friction which opposes rotation of the adjusting screw relative to the frame or support on which the components of the thermostat are mounted.

These and other objects are effected by the invention as will be apparent from the following description taken in connection with the accompanying drawings, forming a part of this application, in which:

Fig. 1 is a partially cut-away plan view of a thermostatic switch incorporating the present invention;

Fig. 2 is a side elevational view of the thermostatic switch shown in Fig. 1;

Fig. 3 is a view taken along the line III—III of Fig. 2; and

Fig. 4 is a partial view of another embodiment of my invention.

Referring particularly to Figs. 1 and 2, the thermostatic switch shown therein comprises a support or frame 1 having a base portion 2, an end portion 3 and a further extension 4 parallel to and opposite a portion of the base. Mounted upon said frame are a pivoted contact or control arm 30, a thermally responsive control means comprising a plate 15 and a bimetallic member 20 for moving said contact arm between open and closed contact positions, and an adjusting screw 50 for setting the temperature at which said bimetallic member operates said contact arm.

The bimetallic member 20 and the plate 15 are pivotally mounted on the frame by means of a pivoted supporting shaft 10. The bimetallic member 20 is formed in the shape of a spiral with a tongue 13 at its inner end adapted to be held within a slot provided in the shaft 10.

The plate 15, for adjusting the bimetal and having a flange portion 52 which engages the end of the adjusting screw 50, is provided with a hole to receive the shaft 10. A nut 17 is threaded on shaft 10 to rigidly secure the bimetal tongue 13, a spacing washer 14 and the plate 15 on the shaft 10.

The shaft 10 is pivotally mounted in the frame by means of pins 11 and 18, shown in Fig. 2, secured to the ends of the shaft 10 and retained in holes in the parallel portions of the frame.

A tension spring 25 is provided to bias the plate 15 in clockwise direction as seen in Fig. 1 about the axis of the shaft 10 to maintain the plate 15 in positive engagement with the end of adjusting screw 50. A slot 26 is formed in the plate 15 to retain one end of the spring, the other end being attached to the base 2 by means of the spring anchoring lug 27.

The contact arm 30 is molded in, and extends from the end of, an insulating bar 31 which is provided with conical pivot points 32 and 32' on opposite sides for pivotally mounting the contact arm.

The contact arm is mounted for pivotal movement about the conical pivot point 32. The apex of the pivot point 32 is received in a recess in an L-shaped bracket 40 attached to the frame. The bimetallic member 20 acts as an over-center compression spring to provide snap action in the pivotal movement of the contact arm 30. The bimetallic member 20 is provided with a groove or seat at its outer end which engages the pivot points 32' to exert a force on the contact arm 30 to hold it against the bracket 40. The bimetallic member also provides the actuating force to move the arm 30 in response to a predetermined change in temperature of the bimetal.

A movable contact 34 is mounted on the end of the contact arm 30 opposite the insulating bar 31. The contact arm 30 is adapted to move to position contact 34 into engagement with a fixed contact 35 or a fixed stop 36. The contact 35 and the stop 36 are respectively mounted on conducting terminal members 37 and 37', which are insulated from each other and mounted upon the base 2 by means of an insulating block 38. The contact arm 30 and the terminal member 37' are electrically connected by a flexible conductor 39.

The adjusting screw 50 is supported in the end portion 3 of the frame 1 by means of a threaded bearing 51, attached to the frame 1.

To increase the friction on the adjusting screw threads, a friction nut 53 is threaded upon the adjusting screw 50. A coiled compression spring 54 is held in compression between the nut 53 and the end portion 3 of the frame and provides a force therebetween which is substantially greater than the force exerted on the end of the screw by the spring 25. A yoke 55, attached to the end portion 3 of the frame, is provided to prevent the nut 53 from rotating when the adjusting screw is rotated, as is more clearly shown in Fig. 3.

In another embodiment of my invention, shown in Fig. 4, I provide a friction increasing means similar to that shown in Fig. 1, except that the friction nut 53 is biased toward the bearing 51 by a coiled compression spring 65 held in compression between the nut and a bracket 66 attached to the frame 1.

The compression spring 54, shown in Fig. 1, biases the friction nut 53 and the bearing 51 apart. If the force of the spring 54 were not greater than the thrust imposed on the end of the screw 50 by reason of the spring 25, then the effect of the spring 54 would be merely to shift some or all of the force opposing such end thrust from the bearing 51 to the nut 53, and there would be no increase in total friction on the threads of the adjusting screw.

When, however, the force of the spring 54 is greater than the end thrust, as is the case in the embodiment of Fig. 1, a portion of the force of the spring which is equal to the end thrust does serve to shift opposing force from the bearing 51 to the nut 53, but the amount of the spring force in excess of this does serve to increase the friction between the threads of the nut 53 and the screw 50. This excess force results in net force on the screw 50 biasing it to the right (in Fig. 1) relative ot the bearing 51, resulting in additional friction between the threads of the bearing 51 and the screw 50 which is equal to the increased friction produced between the threads of the nut 53 and the screw 50, assuming equal coefficients of friction. In other words, the forces exerted by the nut 53 and the bearing 51 on the screw 50 are in opposition to each other.

The force exerted by the nut tending to rotate the screw in one direction is opposed by the force of the bearing tending to rotate the screw in the opposite direction with no change in net torque on the screw.

When the friction nut is biased in the direction of the thrust on the end of the adjusting screw, as is done for example by the friction nut 53 and the compression spring 65 mounted as shown in Fig. 4, no part of the spring force is used to oppose the end thrust. The total friction at the nut is proportional to the spring force, whereas the friction at the threads of the bearing is proportional to the sum of the spring force and the force of the end thrust on the screw. The total spring force again biases the nut and the bearing in opposite directions against the threads of the adjusting screw, thereby increasing friction without any change in net torque on the screw.

It is obvious that a friction nut could be threaded on the adjusting screw on the outside of the frame 1 with the nut biased in either direction axially of the screw to provide increased friction. This invention also contemplates the use of tension springs rather than compression springs to bias the friction nut.

In the above description and explanation I have assumed that the coefficients of friction between the nut and the screw and between the bearing and the screw are substantially the same. It should be obvious to one skilled in the art that different coefficients of friction will produce different amounts of friction at the nut and at the bearing for each unit of force applied.

To limit the angular movement of the adjusting screw 50, a lug 56 is attached to the screw 50 and engages one or the other of the flat surfaces 57 on the bearing 51 when the adjusting screw is rotated sufficiently. Preferably the lug 56 is attached to the adjusting screw after the control device is completely assembled and the adjusting screw is positioned within a desired operating range. The outer end of the adjusting screw may be provided with a slot or a knurled portion to accommodate a screw driver or a control knob for adjustment thereof.

The operation of the bimetal member may be best explained by considering its action when the tongue portion 13 is held in some fixed position corresponding to a particular temperature setting of the adjusting screw. In a cold condition, that is, at a temperature below the temperature at which the thermostat is set to operate, bimetal pressure is exerted in clockwise direction as viewed in Fig. 1, which forces the contact arm 30 into contact closed position and the seat in the free end of the bimetal is moved over center, that is, to the left of the center line connecting the main axis of the bimetal and the fulcrum in the bracket 40.

As the bimetal is heated, its free end tends to move in counterclockwise direction but is resisted by the over center condition of the pivot points on the contact arm. When the temperature of the bimetal is increased to a point above the preset temperature, it exerts a force great enough to overcome the resistance of the toggle assembly and the free end of the bimetal snaps over center and the contact arm is moved to open contact position.

As the bimetal member cools, its free end tends to move in clockwise direction, but it is again resisted by the over center condition of the pivotal points on the contact arm. The temperature of the bimetal member must drop to a temperature slightly below the temperature at which it snapped to the contact open position in order to develop sufficient force to overcome the resistance of the toggle assembly.

The differential between contact opening and contact closing temperatures is dependent upon the contact gap and the initial force applied by the bimetal during assembly.

When the adjusting screw is turned, it adjusts the position of plate 15, which in turn rotates the tongue of the bimetal about the axis of the bimetal. As the tongue of the bimetal is adjusted, the operating temperature at which the bimetal moves the contact arm from closed to open position is changed; for example, if the adjusting screw is turned in the direction to rotate the bimetal tongue counterclockwise as viewed in Fig. 1, the temperature at which the bimetal will unwind sufficiently to move the contact arm to open circuit position will be decreased.

It may also be seen that for a given position of the adjusting screw 50, the temperature at which the thermostat operates to open the circuit may be varied by adjusting the relative positions of the bimetal and the plate 15. This adjustment may be made before the nut 17 is tightened during assembly and also may be made to change the temperature range of response of the switch after the lug 56 is attached to the screw.

While the invention has been shown in several forms, it will be obvious to those skilled in the art that it is not so limited, but is susceptible of various other changes and modifications without departing from the spirit thereof.

What I claim is:

1. A thermostatic switch comprising a support, contacts mounted on said support movable to open and closed contact positions, control means including a thermally-responsive element adapted to move said contacts to open and closed contact positions mounted on said support, a screw threaded in said support for adjusting said element to adjust the operating temperature of said switch, means for biasing said control means into engagement with one end of said adjusting screw, a nut threaded on said screw, means exerting a force between said support and said nut parallel to the axis of the screw, said force having a value such that the axial forces exerted by said nut and said support on said screw are in opposition, and means attached to said support to prevent rotation of said nut.

2. A thermostatic switch comprising a support, contacts mounted on said support movable to open and closed contact positions, control means including a thermally-responsive element adapted to move said contacts to open and closed contact positions mounted on said support, a screw threaded in said support for adjusting said element to adjust the operating temperature of said switch, means for biasing said control means into engagement with one end of said adjusting screw, a nut threaded on said screw, spring means exerting a force parallel to the axis of the screw between said nut and said support which opposes and is greater than the axial force applied to said adjusting screw by said control means, and means attached to said support to prevent rotation of said nut.

3. A thermostatic switch comprising a support, contacts mounted on said support and movable to open and closed contact positions, a temperature-responsive element on said support adapted to move said movable contacts to open and closed contact positions, means pivoted on said frame for adjusting the operating temperature of said element, an adjusting screw for adjusting said pivoted means threaded in said frame, means for biasing said pivoted means into engagement with the end of said screw, a nut threaded on said screw, spring means exerting a force parallel to the axis of the screw between said nut and said frame to bias said nut away from said end of said screw, and means for preventing rotation of said nut when said screw is rotated.

4. A thermostatic switch comprising a support, contacts mounted on said support movable to open and closed contact positions, a thermally-responsive bimetallic member adapted to move said contacts to open and closed contact positions, means for pivotally mounting said member on said support, a screw threaded in said support for adjusting said mounting means to adjust the operating temperature of said switch, means for biasing said mounting means into engagement with one end of said adjusting screw, a nut threaded on said screw between said support and said one end, a spring held in compression between said support and said nut, said spring exerting a force between said support and said nut which is greater than the axial force applied to said adjusting screw by said mounting means, and means attached to said support to prevent rotation of said nut.

References Cited in the file of this patent

UNITED STATES PATENTS

| | | |
|---|---|---|
| 2,248,666 | Fischer | July 8, 1941 |
| 2,402,151 | Dewey | June 18, 1946 |
| 2,585,340 | Miller | Feb. 12, 1952 |